United States Patent
Ito et al.

(10) Patent No.: US 9,686,912 B2
(45) Date of Patent: Jun. 27, 2017

(54) LAWN MOWER HAVING A GRASS COLLECTION SYSTEM WITH AIR FLOW RECYCLE FOR STANDING UP GRASS FOR CUTTING

(71) Applicant: KUBOTA CORPORATION, Osaka (JP)

(72) Inventors: Hirokazu Ito, Osaka (JP); Kazuo Koike, Hyogo (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/197,547

(22) Filed: Mar. 5, 2014

(65) Prior Publication Data
US 2015/0033693 A1 Feb. 5, 2015

(30) Foreign Application Priority Data
Aug. 5, 2013 (JP) .................. 2013-162648

(51) Int. Cl.
*A01D 43/077* (2006.01)
*A01D 34/82* (2006.01)
*A01D 43/063* (2006.01)

(52) U.S. Cl.
CPC ........... *A01D 34/82* (2013.01); *A01D 43/063* (2013.01); *A01D 43/077* (2013.01)

(58) Field of Classification Search
CPC combination set(s) only.
See application file for complete search history.

(56) References Cited

U.S. PATENT DOCUMENTS

| 3,132,456 A * | 5/1964 | Konrad ................ A01D 43/063 15/346 |
| 3,708,968 A * | 1/1973 | Enters et al. .................. 56/16.5 |
| 4,043,100 A * | 8/1977 | Aumann et al. ............... 56/16.5 |
| 4,631,909 A | 12/1986 | McLane |
| 4,819,417 A | 4/1989 | Bryant et al. |

(Continued)

FOREIGN PATENT DOCUMENTS

| DE | 102007044158 A1 * | 3/2008 | ........... A01D 43/077 |
| GB | 2324950 A * | 11/1998 | ........... A01D 43/077 |

(Continued)

OTHER PUBLICATIONS

Japanese Office Action (and Translation) issued in JP 2013-162648 and mailed on Jun. 24, 2016 (6 pages).

*Primary Examiner* — Alicia Torres
(74) *Attorney, Agent, or Firm* — Greenblum & Bernstein, P.L.C.

(57) ABSTRACT

A lawn mower includes a mower deck including a blade rotationally driven to cut grass and generate an air flow to feed the cut grass. A cutting chamber houses the blade. An ejection outlet is open to the cutting chamber and ejects the cut grass. A grass collection container collects the cut grass ejected from the ejection outlet. An air chamber is provided in a vicinity of the cutting chamber and receives the air flow generated by rotation of the blade through the grass collection container. A first passage connects the ejection outlet and the grass collection container. A second passage connects the grass collection container and the air chamber. The air flow supplied from the grass collection container to the air chamber through the second passage is supplied to the cutting chamber.

20 Claims, 9 Drawing Sheets

(56) References Cited

U.S. PATENT DOCUMENTS

| | | | | |
|---|---|---|---|---|
| 4,848,070 | A * | 7/1989 | Berglund | A01D 43/063 56/16.6 |
| 5,678,399 | A * | 10/1997 | Baron | 56/320.2 |
| 5,848,521 | A | 12/1998 | Kobayashi | |
| 6,705,068 | B2 | 3/2004 | Iida et al. | |
| 7,343,727 | B2 * | 3/2008 | Iida | A01D 43/063 56/202 |
| 7,677,019 | B2 * | 3/2010 | Iida et al. | 56/12.2 |
| 7,849,665 | B2 * | 12/2010 | Kaskawitz | A01D 43/063 56/202 |
| 8,156,722 | B2 | 4/2012 | Sugio et al. | |
| 2007/0119138 | A1 * | 5/2007 | Burcham et al. | 56/202 |

FOREIGN PATENT DOCUMENTS

| | | |
|---|---|---|
| JP | 62-64226 | 4/1987 |
| JP | 63-71622 | 5/1988 |
| JP | 1-60633 | 1/1989 |
| JP | 6-303820 | 11/1994 |
| JP | 8-224028 | 9/1996 |
| JP | 2008-54522 | 3/2008 |
| JP | 5139835 | 11/2012 |

\* cited by examiner

LAWN MOWER HAVING A GRASS COLLECTION SYSTEM WITH AIR FLOW RECYCLE FOR STANDING UP GRASS FOR CUTTING

CROSS-REFERENCE TO RELATED APPLICATIONS

The present application claims priority under 35 U.S.C. §119 of Japanese Application No. 2013-162648, filed on Aug. 5, 2013, which is herein expressly incorporated by reference in its entirety.

BACKGROUND OF THE INVENTION

1. Field of the Invention

The present invention relates to a lawn mower including a vehicle body, a mower deck, and a grass collection container. The mower deck, which is supported to the vehicle body, has a blade, a cutting chamber, and an ejection outlet, the blade being rotationally driven to cut grass and generate an air flow to feed the cut grass, the cutting chamber housing the blade, the ejection outlet being open to the cutting chamber and ejecting the cut grass. The grass collection container collects the cut grass ejected from the ejection outlet.

2. Description of Related Art

Japanese Patent Publication No. 5139835 discloses an example of the lawn mower above. The lawn mower disclosed in Japanese Patent Publication No. 5139835 has a configuration in which cut grass ejected from an ejection outlet of a mower deck is collected in a grass collection container ("collection bag (37)" in Japanese Patent Publication No. 5139835) through a duct. Specifically, in the lawn mower in Japanese Patent Publication No. 5139835, the cut grass is fed from the ejection outlet of the mower deck to the duct by an air flow generated by a blade and is then collected in the grass collection container through the duct.

There is a case where the air flow in the mower deck is insufficient in this type of lawn mower. When the air flow is insufficient in the mower deck, the cut grass cannot be reliably fed to the grass collection container, thus possibly making it difficult to perform lawn mowing in a favorable manner.

In view of the above, a lawn mower is desired that prevents an insufficient air flow in a mower deck and allows excellent lawn mowing.

SUMMARY OF THE INVENTION

An advantage of the present invention is to provide a lawn mower including a vehicle body; a mower deck supported to the vehicle body, the mower deck including a blade rotationally driven to cut grass and generate an air flow to feed the cut grass, a cutting chamber housing the blade, and an ejection outlet open to the cutting chamber and ejecting the cut grass; a grass collection container collecting the cut grass ejected from the ejection outlet; an air chamber provided in a vicinity of the cutting chamber and receiving the air flow generated by rotation of the blade through the grass collection container; a first passage connecting the ejection outlet and the grass collection container; and a second passage connecting the grass collection container and the air chamber, wherein the air flow supplied from the grass collection container to the air chamber through the second passage is supplied to the cutting chamber.

According to the present aspect, when the blade housed in the cutting chamber is rotationally driven, the grass is cut and the cut grass is ejected from the ejection outlet by the air flow generated by the blade. The air flow including the cut grass is supplied to the grass collection container through the first passage. In the grass collection container, the cut grass is collected and the air flow from which the cut grass is removed is supplied to the air chamber through the second passage. Then, the air flow supplied to the air chamber is supplied to the cutting chamber. Thus, the air flow generated by rotary drive of the blade housed in the cutting chamber circulates through the first passage, the grass collection container, and the second passage, and then returns to the cutting chamber again.

In the configuration above, the air flow supplied to the air chamber is preferably supplied to the cutting chamber from below the cutting chamber.

According to the present configuration, the air flow supplied to the air chamber is supplied to the cutting chamber therebelow. Thus, the air flow supplied from the air chamber flows from below to above in the cutting chamber. The air flow supplied from the air chamber allows the grass to stand up in the cutting chamber, thus achieving efficient grass cutting with the blade.

Since the air flow returned from the air chamber to the cutting chamber is merged with the air flow generated by the rotary drive of the blade, the air flow can be sufficiently supplied from the ejection outlet of the mower deck to the grass collection container. This ensures feeding of the cut grass to the grass collection container. Accordingly, an insufficient air flow is prevented in the mower and thus excellent lawn mowing can be achieved.

In the configuration above, the ejection outlet is preferably open in a side end portion of the cutting chamber, and the air chamber is preferably provided in a rear portion of the mower deck.

According to the present configuration, the air flow generated by the rotary drive of the blade flows toward the ejection outlet open in the side end portion of the cutting chamber. An insufficient air flow has recently been identified in the rear portion of the mower deck. Since the air chamber is provided in the rear portion of the mower deck, the air flow flowing out from the air chamber can be favorably supplied to the rear portion of the mower deck, where the air flow is insufficient. Accordingly, the air flow supplied from the air chamber can be merged in a direction of the air flow generated by the rotary drive of the blade, and thus the air flow can be effectively intensified from the ejection outlet of the mower deck toward the grass collection container.

In the configuration above, the air chamber preferably includes a partition wall having a shape along an end of a rotation trajectory of the blade and a wall body supported external to the partition wall and serving as a surrounding wall of a space in conjunction with the partition wall.

According to the present configuration, the air chamber is defined by the surrounding wall. This prevents the air flow supplied to the air chamber from being dispersed in a surrounding area and enables supply of a strong air flow from the air chamber to the cutting chamber. In addition, the air chamber is provided by using the partition wall having the shape along the end of the rotation trajectory of the blade such that the wall body is supported external to the partition wall to serve as the surrounding wall. Thus, the air chamber can be configured in a simple manner.

In the configuration above, the grass collection container preferably includes a container main body having a tubular shape in at least a predetermined area of an upper portion;

an air inlet introducing the air flow including the cut grass flowing through the first passage along an inner periphery of the container main body; and an air outlet open in an upper surface of the container main body and supplying the air flow from which the cut grass is centrifuged to the second passage.

According to the present configuration, when the air flow including the cut grass is introduced to the air inlet of the grass collection container, the air flow including the cut grass spirally flows along the tubular shape at least in the predetermined area of the upper portion in the container main body and the cut grass included in the air flow is centrifuged. The centrifuged cut grass is accumulated in the grass collection container. The air flow after the cut grass has been centrifuged flows out from the air outlet and is supplied to the second passage. Thus, the grass collection container is unlikely to be clogged with the cut grass, compared to a grass collection container that simply centrifuges cut grass with a mesh member. With the grass collection container unlikely to be clogged with the cut grass, for example, the air flow from which the cut grass is removed can be stably supplied through the second passage and the air chamber to the cutting chamber where the blade is housed. This effectively prevents a reduction in energy efficiency of grass collection.

In the configuration above, a blower delivering the air to the air chamber is preferably provided in the second passage.

According to the present configuration, the air flow from which the cut grass has been removed passes through the second passage. Thus, even when the blower delivering air to the air chamber is provided in the second passage, the blower is not clogged with the cut grass and the air flow supplied to the air chamber can be effectively intensified by the blower. In addition, with no need to consider strength or dirt associated with clogged cut grass, an inexpensive blower can be employed.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt made to show structural details of the present invention in more detail than is necessary for the fundamental understanding of the present invention, the description is taken with the drawings making apparent to those skilled in the art how the forms of the present invention may be embodied in practice.

An embodiment of the present invention is described below with reference to the drawings.

<Schematic Configuration of Lawn Mower>

Figure 1:
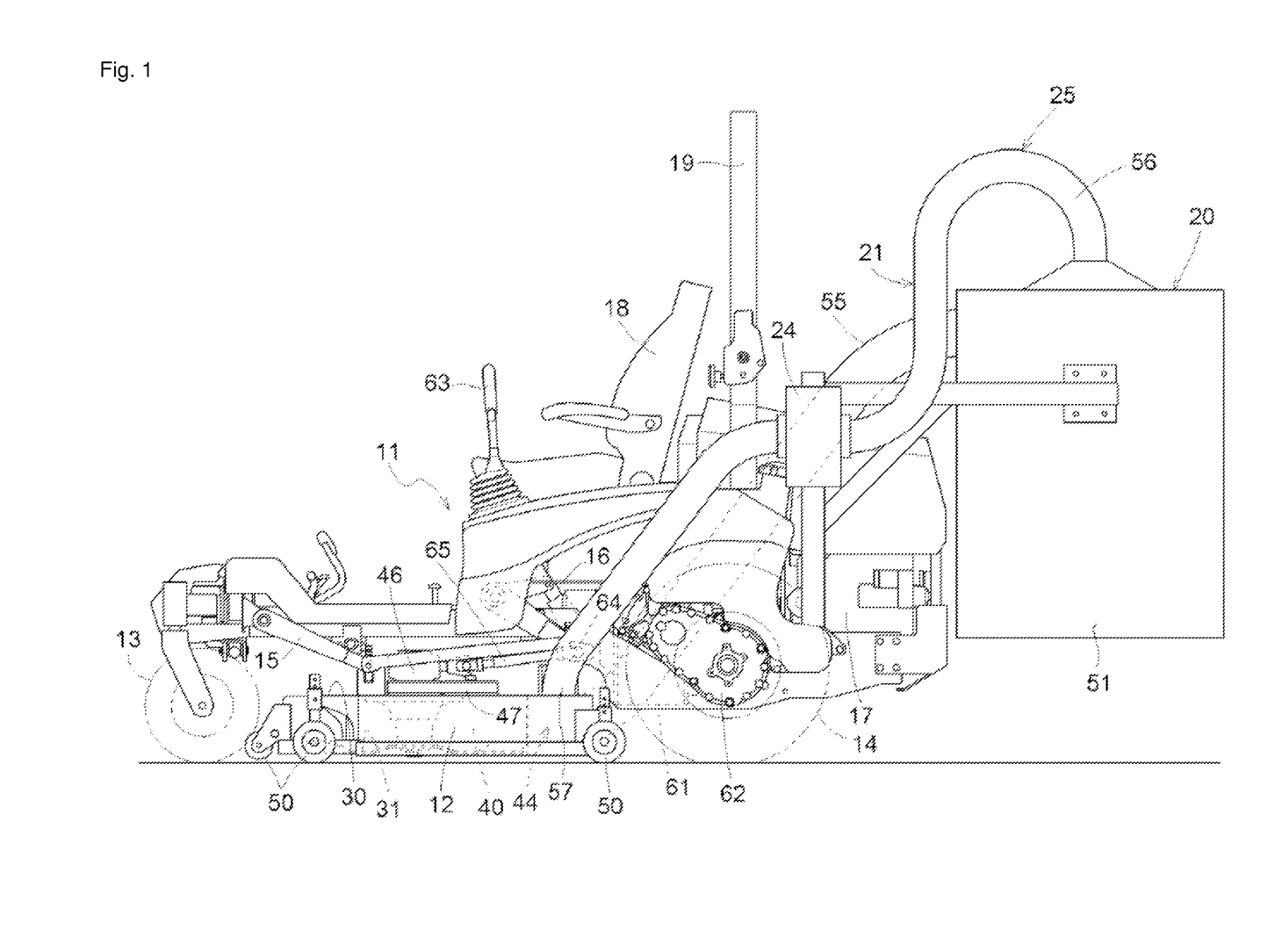
FIG. 1 is an entire side view of a lawn mower.
Figure 2:
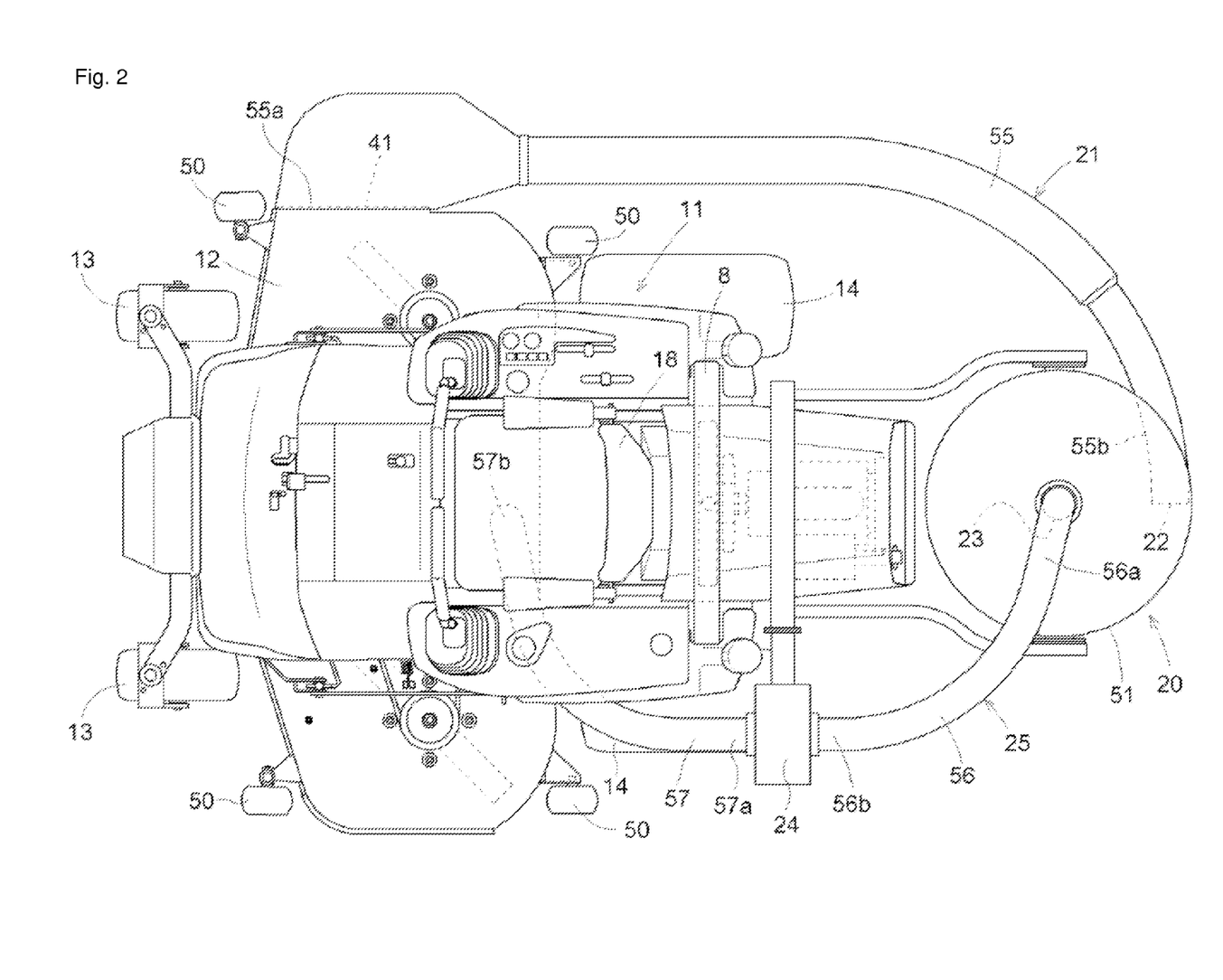
FIG. 2 is an entire plan view of the lawn mower.

FIGS. 1 and 2 illustrate a riding mower according to an embodiment of a lawn mower of the present invention. The riding mower has a vehicle body 11; a left and right pair of front wheels 13 and a left and right pair of drive rear wheels 14, which support the vehicle body 11; and a mower deck 12 supported in a front-rear center portion of the vehicle body 11. The front wheels 13 are caster wheels while the drive rear wheels 14 are drive wheels. The mower deck 12 is suspended and supported through a link mechanism 15 having a four-link structure in a portion below the vehicle body 11 between the front wheels 13 and the drive rear wheels 14. The mower deck 12 can be moved up and down in substantially a parallel state by moving up and down the link mechanism 15 with a lift cylinder 16. An engine 17 is provided in the rear of the vehicle body 11. A driver seat 18 and a ROPS 19, which is a gate shaped roll-over protection frame, are provided in front of the engine 17. In the rear of the vehicle body 11, a grass collection container 20 is provided in which cut grass ejected from the mower deck 12 is collected. An ejection side of the mower deck 12 is connected to an air inlet 22 of the grass collection container 20 through a first passage 21. An air outlet 23 of the grass collection container 20 is connected to a supply side of the mower deck 12 through a second passage 25, in the middle of which a blower 24 is provided.

<Structure of Mower Deck>

Figure 3:
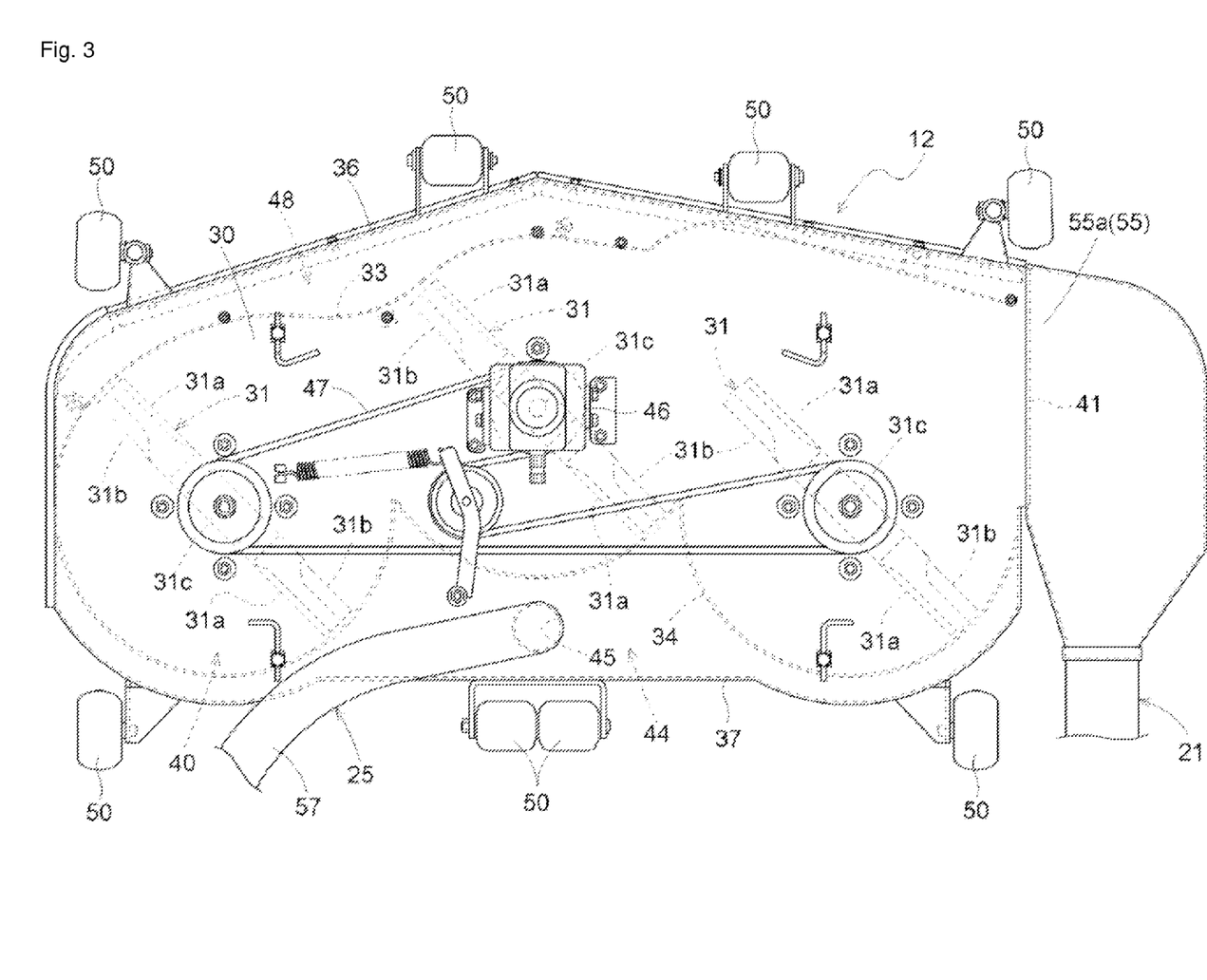
FIG. 3 is a cross-sectional plan view of a mower deck.
Figure 4:
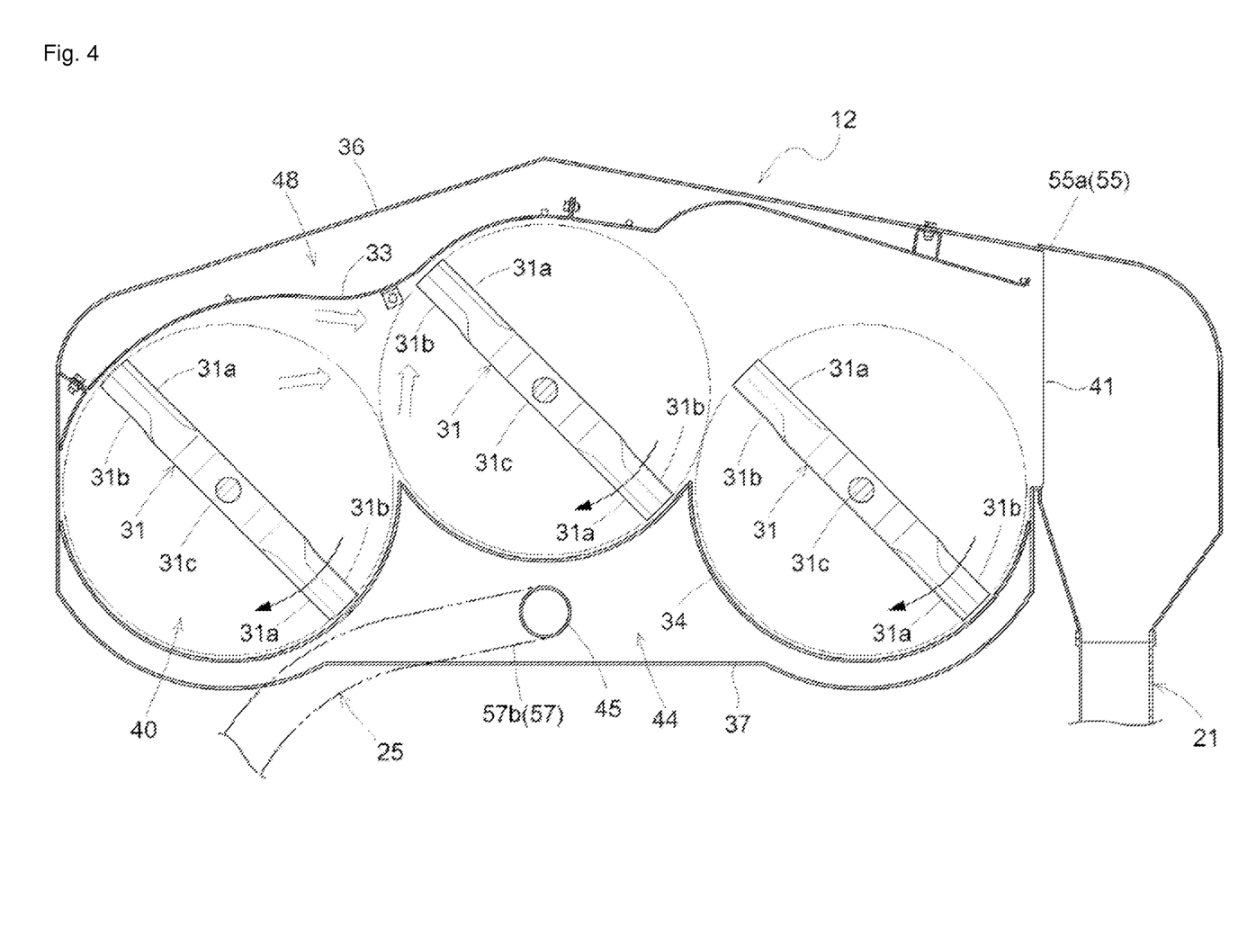
FIG. 4 is a plan view of the mower deck.

With reference to FIG. 1, the mower deck 12 is a flat deck that has a top panel 30 having entirely the same height. With reference to FIGS. 1, 3, and 4, three plate-shaped blades 31 are provided on a lower surface of the top panel 30, the blades 31 each being rotationally driven around a vertical axis to cut grass and generate an air flow to feed the cut grass. The three blades 31 are positioned in a triangle from a plan view, in which the center blade 31 is displaced slightly further forward than the left blade 31 and the right blade 31. Each blade 31 has a cutting blade 31a and a wind generating blade 31b, the cutting blade 31a being provided in a downstream side of rotation in a front end portion, the wind generating blade 31b being provided in an upstream side of the rotation in the front end portion and being bent in a vertical direction.

A front baffle plate 33 is provided in front of the three blades 31, the front baffle plate 33 extending vertically from the lower surface of the top panel 30 and having a wavy curved shape along a front portion of an end of a rotation trajectory of each blade 31. A rear baffle plate 34 (corresponding to a "partition wall") is provided in the rear of the three blades 31, the rear baffle plate 34 extending vertically from the lower surface of the top panel 30 and having a wavy curved shape along a rear portion of the end of the rotation trajectory of each blade 31. A front wall 36 is provided in front of the front baffle plate 33, the front wall 36 extending vertically from the lower surface of the top panel 30. A rear wall 37 (corresponding to a "wall body") is provided in the rear of the rear baffle plate 34, the rear wall 37 extending vertically from the lower surface of the top panel 30. The rear wall 37 is supported external to the rear baffle plate 34. A lower end portion of the rear wall 37 has substantially the same height as a lower end portion of the rear baffle plate 34.

A space defined by the top panel 30, the front baffle plate 33, and the rear baffle plate 34 is a cutting chamber 40 open downward and elongated in a left-right direction. The three blades 31 are positioned in the cutting chamber 40. The cutting chamber 40 has an ejection outlet 41 between the front baffle plate 33 and the rear baffle plate 34, through which cut grass is ejected outside of the mower deck 12. The ejection outlet 41 is open in a side end portion of the cutting chamber 40, specifically, open in a right end portion. Thus, the mower deck 12 ejects cut grass from the right portion.

A space defined by the top panel 30, the rear baffle plate 34, and the rear wall 37 is an air chamber 44 open downward. Specifically, the air chamber 44 is defined by the rear baffle plate 34 and the rear wall 37, which is supported external to the rear baffle plate 34 to configure a surrounding wall of the space in conjunction with the rear baffle plate 34. The air chamber 44 is positioned in a rear portion of the mower deck 12, adjacent to a rear portion of the cutting chamber 40. A space defined by the top panel 30, the front baffle plate 33, and the front wall 36 is another air chamber 48 open downward. Specifically, the other air chamber 48 is defined by the front baffle plate 33 and the front wall 36, which is supported external to the front baffle plate 33 to configure a surrounding wall of the space in conjunction with the front baffle plate 33. The other air chamber 48 is positioned in a front portion of the mower deck 12, adjacent to a front portion of the cutting chamber 40. Thus, the air chamber 44 and the other air chamber 48 are provided integral to the mower deck 12 and adjacent to the cutting chamber 40. Such an "air chamber" is not limited to the air chamber 44, which is provided adjacent to the rear portion of the cutting chamber 40, or the other air chamber 48, which is provided adjacent to the front portion of the cutting chamber 40. Specifically, the "air chamber" may be provided adjacent to the cutting chamber 40 in any direction.

The air chamber 44 has a supply inlet 45 open in a middle portion thereof to discharge an air flow supplied from the second passage 25 to the top panel 30. An air flow generated by the blades 31 in the cutting chamber 40 is supplied to the air chamber 44 through the first passage 21, the grass collection container 20, and the second passage 25. The air flow supplied from the second passage 25 to the air chamber 44 is supplied to the cutting chamber 40 through between the ground and the rear baffle plate 34 (refer to FIG. 7). The air flow from the second passage 25 is optimally supplied to the air chamber 44 positioned in the rear portion of the mower deck 12. Alternatively, the air flow from the second passage 25 may be supplied to the other air chamber 48 positioned in the front portion of the mower deck 12.

With reference to FIG. 3, a bevel gear case 46 is provided on an upper surface of the top panel 30, the bevel gear case 46 transmitting power from the engine 17 to the center blade 31 (power transmission from the engine 17 to the bevel gear case 46 will be described later). The bevel gear case 46 converts rotary power into vertical axis rotation, which is transmitted to a rotation axis 31c of the center blade 31. The rotation axis 31c of the center blade 31, the rotation axis 31c of the left blade 31, and the rotation axis 31c of the right blade 31 are interlocked by a belt 47 wound therearound. Thus, when the center blade 31 is rotationally driven, the left blade 31, the center blade 31, and the right blade 31 are rotationally driven by the belt 47 concurrently in conjunction with one another in the same direction (clockwise from a plan view) at the same rate. Accordingly, grass on the ground is cut by the left blade 31, the center blade 31, and the right blade 31. Concurrently, the air flow directed to the ejection outlet 41 in the right end portion is generated to eject cut grass from the ejection outlet 41 in the right portion of the mower deck 12.

A plurality of free rotating wheels 50 are provided around the mower deck 12 to climb over an obstacle. When the mower deck 12, which is suspended and supported by the link mechanism 15, passes over a bump on the ground, for example, the free rotating wheels 50 climb over the bump. With the free rotating wheels 50 climbing over the bump, a predetermined distance is secured between the mower deck 12 and the bump on the ground, thus preventing the mower deck 12 from contacting and scraping the ground.

<Structure of Grass Collection Container>

Figure 5:
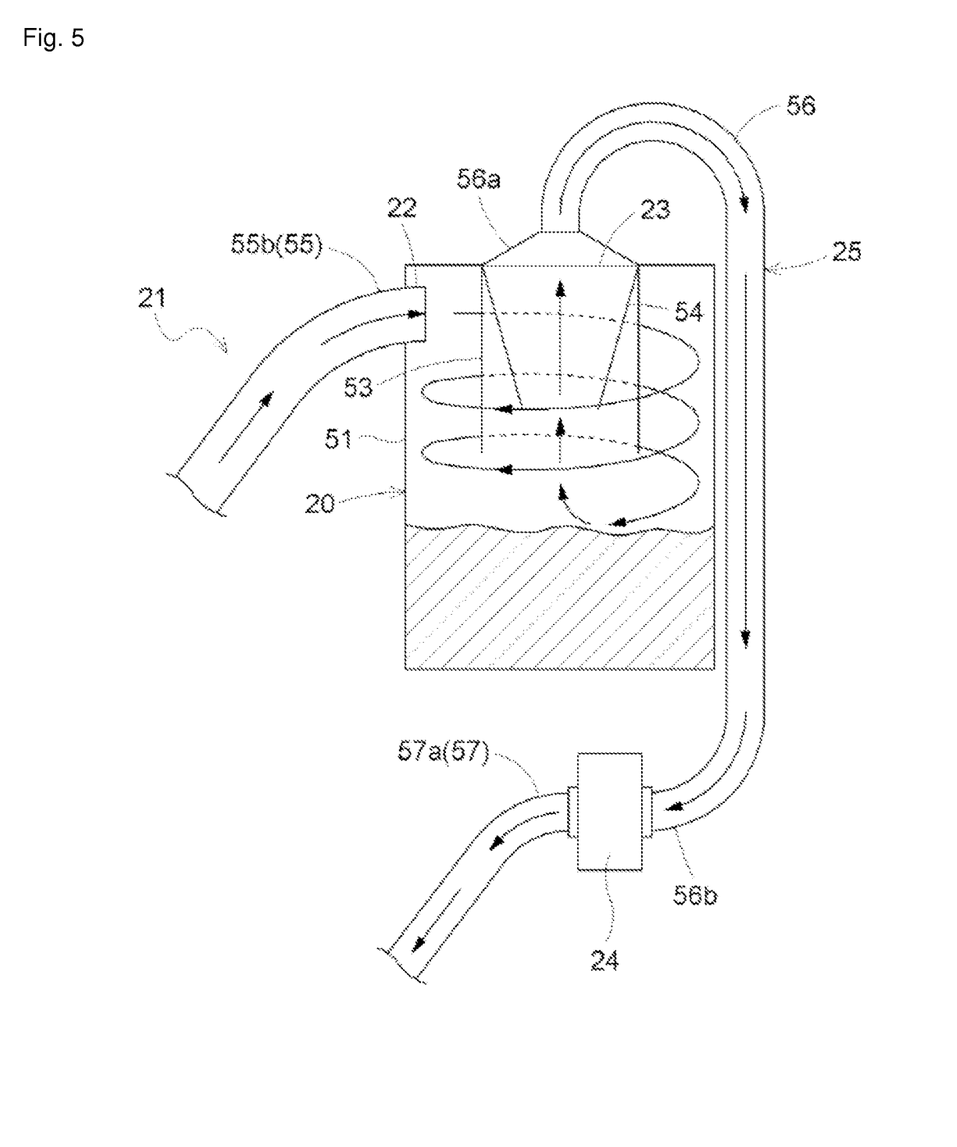
FIG. 5 is a schematic view of a grass collection container.

The grass collection container 20 shown in FIGS. 1, 2, 5, and 6 collects cut grass ejected from the ejection outlet 41 of the mower deck 12. With reference to FIG. 5, the grass collection container 20 has a container main body 51, the air inlet 22, an inner tubular body 53, a tapered tubular body 54, and the air outlet 23. The container main body 51 has a tubular shape in at least a predetermined area of an upper portion. Specifically, the container main body 51 has a tubular shape as a whole with closed upper and lower surfaces. The container main body 51 collects and stores cut grass therein. The air inlet 22 is open in a tangential direction of an inner periphery of the container main body 51. The air flow including cut grass is horizontally introduced to the air inlet 22 through the first passage 21 that connects the ejection outlet 41 and the grass collection container 20. In other words, the air inlet 22 introduces the air flow including the cut grass that flows through the first passage 21 along the inner periphery of the container main body 51. The inner tubular body 53 is fixated to the upper surface in a central portion of the container main body 51. The tapered tubular body 54 is fixated to the upper surface in the central portion of the container main body 51 and tapers downward. The inner tubular body 53 and the tapered tubular body 54 are provided concentric to the container main body 51 and are connected to the air outlet 23. The air outlet 23 is open in the upper surface of the container main body 51 and supplies to the second passage 25 the air flow from which the cut grass is centrifuged.

With reference to FIG. 2, the first passage 21 specifically has a first end portion 55a and a second end portion 55b, the first end portion 55a being connected to the ejection outlet 41 of the mower deck 12, the second end portion 55b being formed of an ejection duct 55 connected to the air inlet 22 of the grass collection container 20. The second end portion 55b of the ejection duct 55 is inserted inside the grass collection container 20 from the air inlet 22. The first end portion 55a of the ejection duct 55 is detachably attached to the ejection outlet 41 of the mower deck 12. Thus, when the first end portion 55a of the ejection duct 55 is detached from the ejection outlet 41 of the mower deck 12, the air flow from the first end portion 55a of the ejection duct 55 can be changed to be discharged to any location. Furthermore, when the first end portion 55a of the ejection duct 55 is detached from the ejection outlet 41 of the mower deck 12 and the blower 24 is driven, a sweeper function is available that collects dust including cut grass from the first end portion 55a of the ejection duct 55 into the grass collection container 20.

With reference to FIG. 2, the second passage 25 specifically includes a first air discharge duct 56, the blower 24, and a second air discharge duct 57, the first air discharge duct 56 connecting the grass collection container 20 and the blower 24 that delivers air to the air chamber 44, the blower 24 sucking in the air from the grass collection container 20, and second air discharge duct 57 connecting the blower 24 and the air chamber 44. The first air discharge duct 56 has a first end portion 56a and a second end portion 56b, the first end portion 56a being connected to the air outlet 23 of the grass collection container 20, the second end portion 56b being connected to an inflow side of the blower 24. The second air discharge duct 57 has a first end portion 57a and a second end portion 57b, the first end portion 57a being connected to an outflow side of the blower 24, the second end portion 57b being connected to the supply inlet 45 of the air chamber 44.

<Description of Power Transmission and Others>

Output from the engine 17 is supplied to a counter case 61 shown in FIG. 1 and is split into travel power and work power (detailed structure is not shown in the drawing). The travel power split in the counter case 61 is supplied to a left and right pair of HST (hydrostatic continuously variable transmission; not shown in the drawing) provided on left and right sides of the counter case 61. Variable output from the HST is transmitted separately to the left and right drive rear wheels 14 through a deceleration case 62. By independently swinging a left and right pair of traction levers 63 provided swingably back and forth on left and right sides of the driver seat 18, the HST that drives the left and right drive rear wheels 14 continuously shifts gear for forward and reverse travel independently for the left and right drive rear wheels 14. Operation of the left and right pair of traction levers 63 enables to perform a straight forward and reverse travel, a pivot turn, and a spin turn, as desired. The work power split in the counter case 61 is output forward from a front lower portion of the counter case 61 through a PTO shaft 64 projecting forward. The work power transmitted from the PTO shaft 64 is transmitted through a flexible and expandable/contractable shaft power train 65 to the bevel gear case 46 shown in FIG. 3 to rotationally drive the blades 31. The work power split in the counter case 61 is transmitted to the blower 24, which is driven by the work power.

<Description of Operation>

Figure 6:
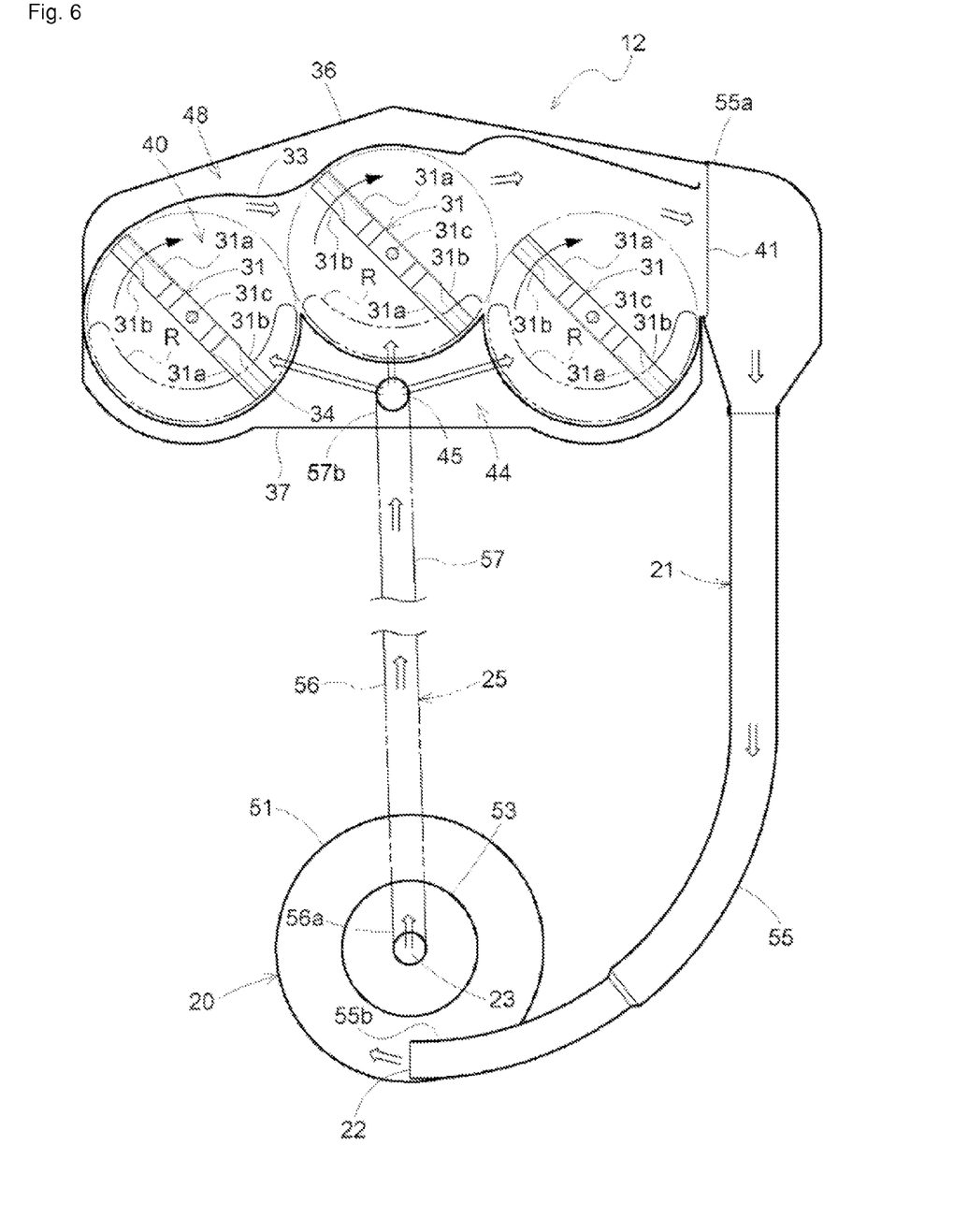
FIG. 6 illustrates an air flow in the mower deck from a lateral cross-sectional plan view.

With reference to FIG. 6, when the left blade 31, the center blade 31, and the right blade 31 are rotationally driven, grass on the ground is cut and the cut grass is ejected from the ejection outlet 41 and an air flow including the cut grass flows into the ejection duct 55. The air flow including the cut grass flowing into the ejection duct 55 is introduced from the air inlet 22 of the grass collection container 20, and then the cut grass is centrifuged from the air flow. The air from which the cut grass is centrifuged is then discharged from the air outlet 23 of the grass collection container 20. At this time, the air is sucked in from the grass collection container 20 by the blower 24, which assists in centrifuging the cut grass in the grass collection container 20. In addition, one end portion of the tapered tubular body 54 has a smaller diameter than the air outlet 23 in the grass collection container 20. This reduces a possibility of mixing the cut grass into the air flow discharged from the air outlet 23. The air flow free from the cut grass and discharged from the air outlet 23 passes through the first air discharge duct 56 and the second air discharge duct 57 as being accelerated by the blower 24, and is then supplied to the supply inlet 45 of the cutting chamber 44. In the cutting chamber 40, the air flow is likely to be insufficient in an area R (refer to FIGS. 6 and 7) positioned in a downstream of a feeding direction of the cut grass in a rotation range of the blades 31. The air flow supplied to the air chamber 44 is supplied to the area R positioned in the rear portion of the cutting chamber 40 through a space between the lower end portion of the rear baffle plate 34 and the ground. Thus, the air flow supplied from the air chamber 44 to the cutting chamber 40 is merged into the air flow generated by rotary drive of the blades 31. This ensures the air flow sufficient from inside the mower deck 12 to the ejection outlet 41, thus allowing excellent grass cutting and efficient collection of the cut grass in the grass collection container 20.

Figure 7:
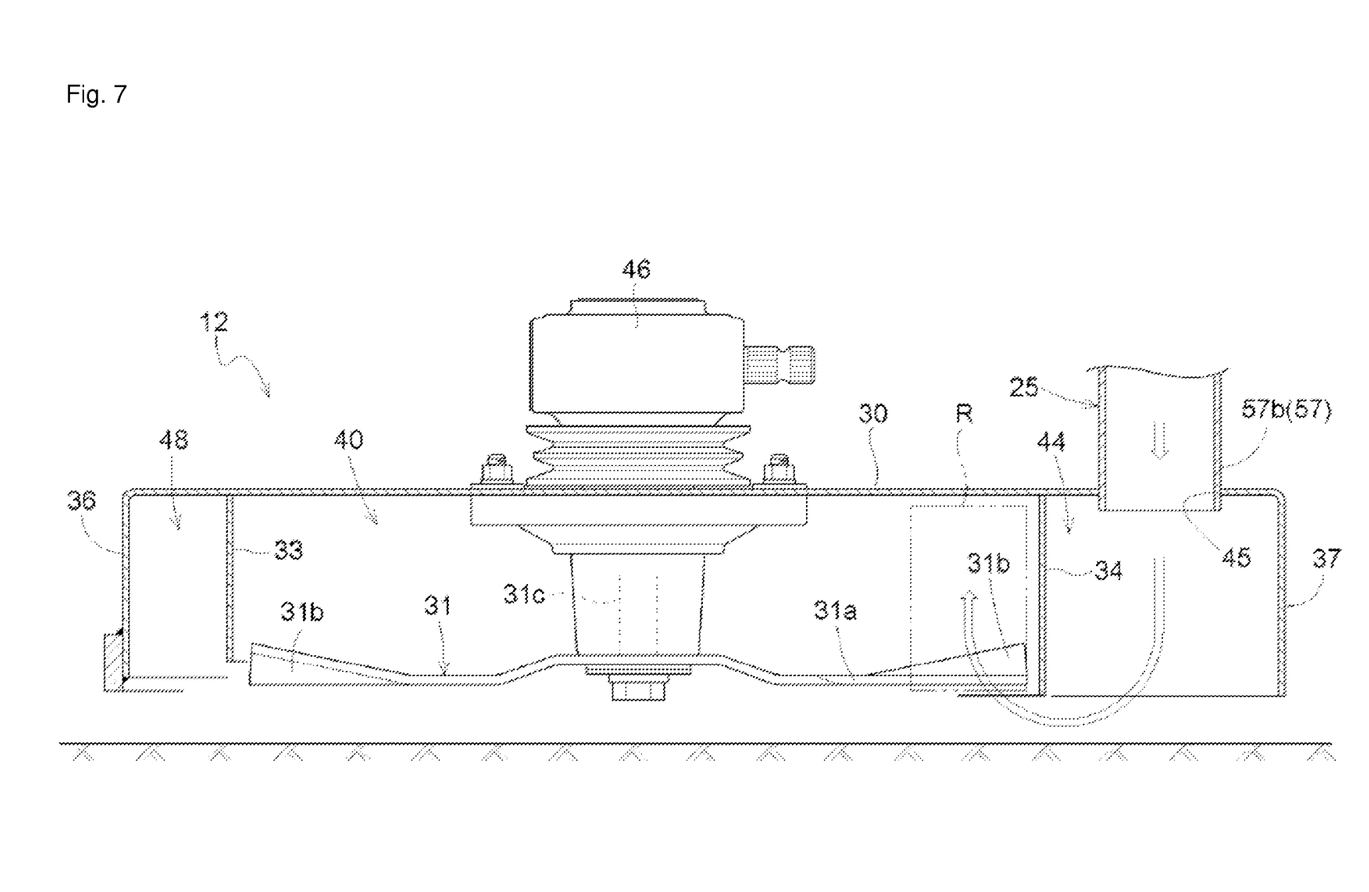
FIG. 7 illustrates an air flow in the mower deck from a longitudinal cross-sectional plan view.

Basically, grass is cut by the blades 31 in the front area of the cutting chamber 40. Grass failing to be processed in the front area of the cutting chamber 40 is cut in the rear area R of the cutting chamber 40. At this time, the air flow from the air chamber 44 is supplied to the area R from below the cutting chamber 40. Thus, the air flow in the area R flows from below to above to allow the grass to stand up. Thereby, the grass failing to be processed in the front area of the cutting chamber 40 can be efficiently cut in the rear area R of the cutting chamber 40.

Figure 8:
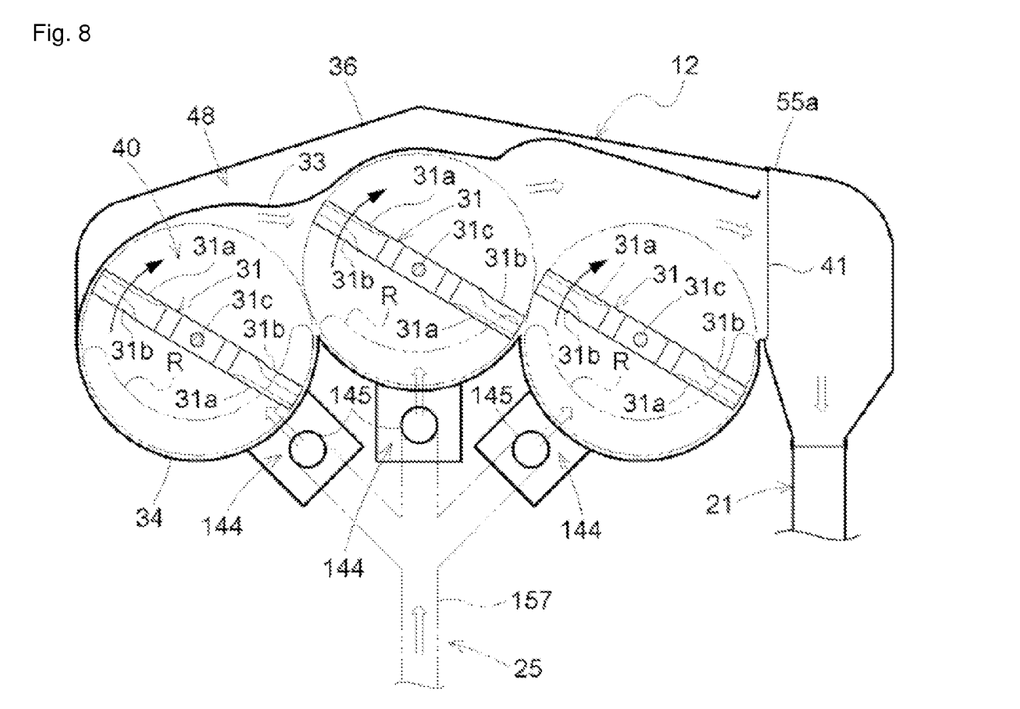
FIG. 8 is a cross-sectional plan view illustrating the vicinity of a mower deck in an alternative embodiment.

Alternative Embodiments (1) In the embodiment above, an example is described in which one air chamber 44 is provided. However, the present invention is not limited to this configuration. With reference to FIG. 8, for example, an air chamber 144 may be provided separately to each of the blades 31. In this case, a supply inlet 145 is open in each air chamber 144 and is connected with a distribution duct 157 that serves as a second passage. The distribution duct 157 is branched and connected to the associated air chamber 144. Thus, an air flow from the second passage 25 can be evenly distributed to the area R of each blade 31. In addition, such an air chamber 144 is not limited to be provided to all the blades 31, and may be provided only to some of the blades 31. For instance, the air chamber 144 may be provided to the most upstream blade 31 in the grass feeding direction, where the air is most likely to be insufficient in the cutting chamber 40.

Figure 9:
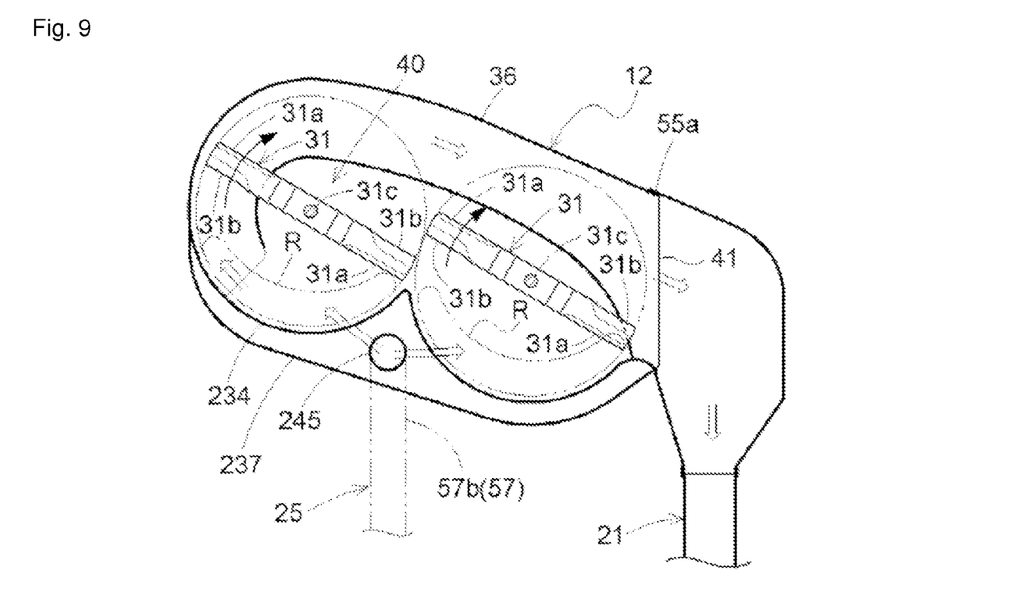
FIG. 9 is a cross-sectional plan view illustrating the vicinity of a mower deck in an alternative embodiment.

(2) In the embodiment above, an example is described in which three blades 31 are provided. However, the present invention is not limited to this configuration. With reference to FIG. 9, for example, two blades 31 may be provided. A front baffle plate 233 has a wavy curved shape along the front portions of the ends of the rotation trajectories of the two blade 31. A rear baffle plate 234 has a wavy curved shape along the rear portions of the ends of the rotation trajectories of the two blade 31. The front wall 236 is provided in front of the front baffle plate 233, and the rear wall 237 is provided in the rear of the rear baffle plate 234. In this case, a supply inlet 245 is provided in the air chamber 244 in the vicinity of a middle portion between the two blades 31. Then, an air flow from the second passage 25 can be evenly distributed to the areas R for the two blades 31. Alternatively, one blade 31 may be provided; four or more blades 31 may be provided.

(3) In the embodiment above, an example is described in which the container main body 51 has a tubular shape as a whole with the closed upper and lower surfaces. However, the present invention is not limited to this configuration. Provided that a container main body has a tubular shape in a predetermined area of an upper portion required for centrifuging, a portion other than the predetermined area of the upper portion may be formed into another shape, such as a rectangular shape in cross section.

Figure 10:
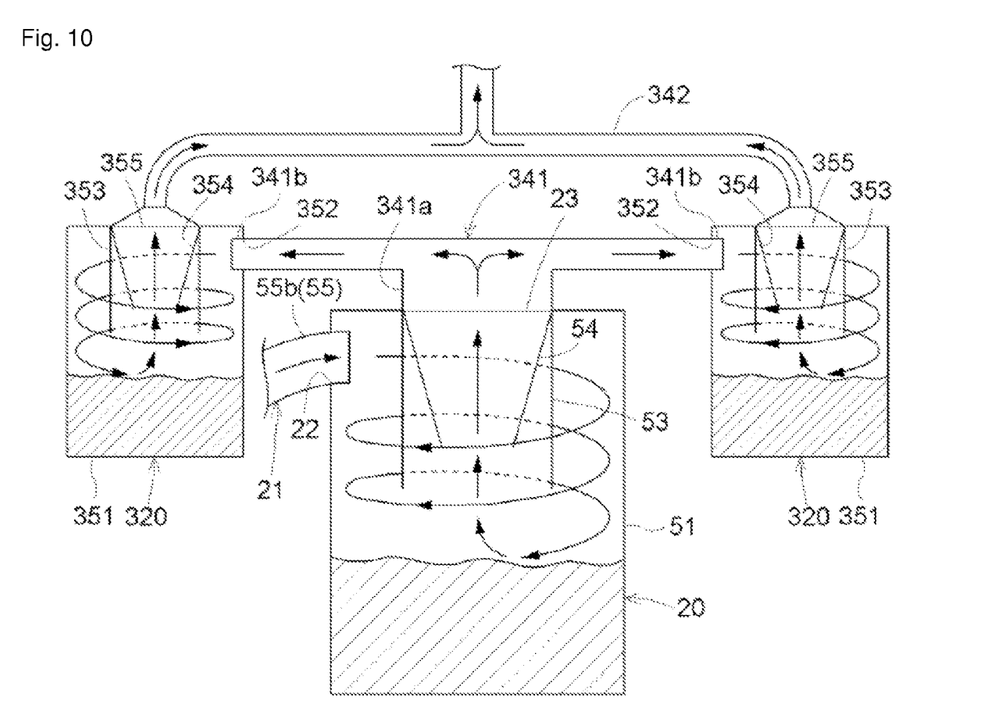
FIG. 10 is a plan view illustrating the vicinity of a grass collection container in an alternative embodiment.

(4) In the embodiment above, an example is described in which only one grass collection container 20 is provided. However, the present invention is not limited to this configuration. With reference to FIG. 10, for example, in addition to the grass collection container 20 described in the embodiment above, two sub grass collection containers 320 may be auxiliary provided, the sub grass collection containers 320 each having a similar structure to the grass collection container 20 and a smaller size than the grass collection container 20. Similar to the grass collection container 20, the sub grass collection container 320 has a container main body 351, an air inlet 352, an inner tubular body 353, a tapered tubular body 354, and an air outlet 355. In this case, a first end portion 341a of a branch duct 341 branching to each sub grass collection container 320 is connected to the air outlet 23 of the grass collection container 20. A branched second end portion 341b of the branch duct 341 is connected to the air inlet 352 of each sub grass collection container 320. The air outlet 355 of each sub grass collection container 320 is connected to a merging duct 342 merging air flows discharged from the sub grass collection containers 320. This merging duct 342 serves as the second passage 25. Thus, an air flow including cut grass introduced to the grass collection container 20 from the first passage 21 is first centrifuged from the cut grass in the grass collection container 20. Then, the air flow after the cut grass has been centrifuged is further centrifuged in the sub grass collection containers 320. Accordingly, the cut grass can be substantially completely removed from the air flow. In addition to the configuration shown in FIG. 10, one sub grass collection container 320 may be provided. Alternatively, three or more sub grass collection containers 320 may be provided.

(5) In the embodiment above, the grass collection container 20 is described in which the cut grass is centrifuged from the air flow including the cut grass. However, the present invention is not limited to this configuration. Another type of grass collection container may be employed in which, for example, cut grass is removed from a discharged air flow by a filter, such as a mesh member.

(6) In the embodiment above, an example is described in which the grass collection container 20 is provided in the rear of the vehicle body 11. However, the present invention is not limited to this configuration. The air flow free from the cut grass and discharged from the grass collection container 20 is supplied to the second passage 25. Thus, the grass collection container 20 may be provided in any location, such as a front portion of the vehicle body 11, a location in front of the driver seat 18 in the vehicle body 11, or a side portion of the vehicle body 11.

(7) In the embodiment above, an example is described in which the mower deck 12 is supported in the front-rear central portion of the vehicle body 11. However, the present invention is not limited to this configuration. For example, the mower deck 12 may be supported in the front or rear portion of the vehicle body 11.

(8) In the embodiment above, an example is described in which the mower deck 12 ejects the cut grass from the right portion. However, the present invention is not limited to this configuration. For example, a mower deck that ejects cut grass from a left portion or from a rear portion may be employed.

(9) In the embodiment above, an example is described in which the blower 24 is provided in the second passage 25. However, the present invention is not limited to this configuration, and the blower 24 may be omitted from the second passage 25. Furthermore, in the embodiment above, another blower may be provided in the first passage 21, the blower sucking in the air from the ejection outlet 41 of the mower deck 12 to intensify the air flow from the ejection outlet 41 of the mower deck 12 toward the air inlet 22 of the grass collection container 20.

The present invention is applicable to various lawn mowers collecting grass cut by a mower deck into a grass collection container.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A ride-on lawn mower comprising:
a vehicle body;
a mower deck supported by or on the vehicle body, the mower deck comprising:
at least one rotationally driven blade configured to cut grass and generate an air flow capable of transporting the cut grass;
a cutting chamber housing the at least one blade; and
an ejection outlet adapted to allow the cut grass to be ejected;
at least one grass collection container collecting the cut grass ejected from the ejection outlet;
a first passage connecting the ejection outlet and the at least one grass collection container;
a second passage connecting the at least one grass collection container and at least one air chamber arranged inside the mower deck and in a vicinity of the cutting chamber;
said air chamber being located peripherally outside said cutting chamber;
a vertical partition wall located inside the mower deck and separating the at least one air chamber and the cutting chamber;
said driven blade being located inside said vertical partition wall; and
said vertical partition wall comprising at least one of:
a curved section; and
an upper end extending to an upper inside surface of the mower deck,
wherein an air flow supplied to the at least one air chamber from the at least one grass collection container is supplied to the grass collection container from the cutting chamber, and
wherein air from said supplied air flow is introduced into the at least one air chamber at a location peripheral to the cutting chamber and functions to stand up the grass during grass cutting.

2. The lawn mower according to claim 1, wherein the air flow supplied to the at least one air chamber exits the air chamber and enters into the cutting chamber from below the cutting chamber.

3. The lawn mower according to claim 1, wherein the ejection outlet is arranged on either a left lateral side or a right lateral side of the cutting chamber and the at least one air chamber is arranged at a rear area of the mower deck.

4. The lawn mower according to claim 1, wherein the ejection outlet is arranged on either a left lateral side or a right lateral side of the cutting chamber and the at least one air chamber is arranged at a front area of the mower deck.

5. A lawn mower comprising:
a vehicle body;
a mower deck supported by or on the vehicle body, the mower deck comprising:
  at least one rotationally driven blade configured to cut grass and generate an air flow capable of transporting the cut grass;
  a cutting chamber housing the at least one blade; and
  an ejection outlet adapted to allow the cut grass to be ejected;
at least one grass collection container collecting the cut grass ejected from the ejection outlet;
a first passage connecting the ejection outlet and the at least one grass collection container;
a second passage connecting the at least one grass collection container and at least one air chamber arranged in a vicinity of the cutting chamber;
said air chamber being located peripherally outside said cutting chamber; and
a vertical partition wall separating the at least one air chamber and the cutting chamber and comprising at least one of:
  a curved section; and
  an upper end extending to an upper inside surface of the mower deck; and
said driven blade being located inside said partition wall,
wherein an air flow supplied to the at least one air chamber from the at least one grass collection container is supplied to the grass collection container from the cutting chamber,
wherein air from said supplied air flow is introduced into the at least one air chamber at a location peripheral to the cutting chamber and functions to stand up the grass during grass cutting, and
wherein the at least one air chamber is defined by at least:
  the vertical partition wall with the curved section having a shape conforming to a rotation trajectory of the blade; and
  a sidewall of the mower deck.

6. The lawn mower according to claim 1, wherein the at least one grass collection container comprises a container main body having at least a partially tubular shaped upper portion.

7. The lawn mower according to claim 6, wherein the at least one grass collection container comprises an air inlet configured to introduce an air flow containing the cut grass along an inner periphery of the container main body.

8. The lawn mower according to claim 6, wherein the at least one grass collection container comprises an air outlet arranged on an upper end of the container main body.

9. The lawn mower according to claim 6, wherein the at least one grass collection container is configured to create a centrifugal air flow within the container main body.

10. The lawn mower according to claim 1, further comprising a blower coupled to at least one of:
the at least one air chamber; and
the second passage.

11. A ride-on lawn mower comprising:
a vehicle body;
a mower deck supported by or on the vehicle body and comprising cutting blades arranged in a cutting chamber and being configured to cut grass and generate an air flow capable of transporting the cut grass laterally to an ejection outlet;
at least one grass collection container collecting the cut grass ejected from the ejection outlet;
a first tubing section connecting the ejection outlet and the at least one grass collection container;
a second tubing section connecting the at least one grass collection container and at least one air chamber;
said at least one air chamber being each of:
  located peripherally outside said cutting chamber;
  separated from the cutting chamber by a vertical wall;
  arranged in a vicinity of the cutting chamber; and
  located within the mower deck; and
said cutting blades being located inside said vertical wall,
wherein the second tubing section supplies air flow to the at least one air chamber from the at least one grass collection container, and
wherein air from said supplied air flow is introduced into the cutting chamber from below the cutting blades.

12. A ride-on lawn mower comprising:
a vehicle body;
a mower deck supported by or on the vehicle body and comprising cutting blades arranged in a cutting chamber and being configured to cut grass and generate an air flow capable of transporting the cut grass laterally to an ejection outlet;
at least one grass collection container configured to collect the cut grass;
a first tubing section adapted to transport a first air flow containing air and the cut grass from the ejection outlet to the at least one grass collection container;
a second tubing section adapted to transport a second air flow from the at least one grass collection container to at least one air chamber that is located peripherally outside the cutting chamber;
the second tubing section being connected to the at least one air chamber at one of:
  a rear portion of the mower deck; and
  a portion of the mower deck located behind the ejection outlet; and
said at least one air chamber being separated from the cutting chamber by an internal wall that is spaced inwardly from a sidewall of the mower deck; and
said cutting blades being located inside the internall wall,
wherein the at least one grass collection container is configured to remove cut grass from the first air flow and thereafter discharge the second air flow to the second tubing section.

13. A lawn mower comprising:
a vehicle body;
a mower deck supported by or on the vehicle body and comprising cutting blades arranged in a cutting chamber and being configured to cut grass and generate an air flow capable of transporting the cut grass laterally to an ejection outlet;
at least one grass collection container configured to collect the cut grass;
a first tubing section adapted to transport a first air flow containing air and the cut grass from the ejection outlet to the at least one grass collection container;
a second tubing section adapted to transport a second air flow from the at least one grass collection container to at least one air chamber;

the second tubing section being connected to a passage that is coupled to the at least one air chamber and that is located at one of:
a rear portion of the mower deck; and
a portion of the mower deck located behind the ejection outlet;
said at least one air chamber being separated from the cutting chamber by an internal wall that is spaced inwardly from a sidewall of the mower deck; and
said cutting blades being located inside the internal wall,
wherein the at least one grass collection container is configured to remove cut grass from the first air flow and thereafter discharge the second air flow to the second tubing section, and
wherein the at least one air chamber is arranged in at least one peripherally outside region of the mower deck.

14. The lawn mower according to claim 12, wherein the first tubing section is larger in cross-section than the second tubing section.

15. The lawn mower according to claim 11, wherein the first tubing section is larger in cross-section than the second tubing section and the lawn mower is a rear engine riding mower.

16. The lawn mower according to claim 1, wherein the first passage is larger in cross-section than the second passage and the lawn mower further comprises a driver seat.

17. The lawn mower according to claim 11, wherein the first tubing section is larger in cross-section than the second tubing section and an outlet end of the second tubing section is coupled to one of:
a rear portion of the mower deck; or
a portion of the mower deck located behind the ejection outlet.

18. A lawn mower comprising:
a vehicle body;
a mower deck supported by or on the vehicle body and comprising cutting blades arranged in a cutting chamber and being configured to cut grass and generate an air flow capable of transporting the cut grass laterally to an ejection outlet;
at least one grass collection container configured to collect the cut grass;
a first tubing section adapted to transport a first air flow containing air and the cut grass from the ejection outlet to the at least one grass collection container;
a second tubing section adapted to transport a second air flow from the at least one grass collection container to at least one air chamber;
the second tubing section being connected to a passage that is coupled to the at least one air chamber and that is located at one of:
a rear portion of the mower deck; and
a portion of the mower deck located behind the ejection outlet;
said at least one air chamber being located peripherally outside of the cutting chamber and being separated from the cutting chamber by an internal wall that is spaced inwardly from a sidewall of the mower deck; and
said cutting blades being located inside the internal wall,
wherein the at least one grass collection container is configured to remove cut grass from the first air flow and thereafter discharge the second air flow to the second tubing section, and
wherein the first tubing section is larger in cross-section than the second tubing section and air cleaned of grass is introduced into the cutting chamber from below the cutting blades.

19. The lawn mower according to claim 1, wherein the at least one rotationally driven blade comprises plural blades and the at least one air chamber is a peripheral chamber located outside the cutting chamber and is defined by the vertical partition wall separating the peripheral chamber from the cutting chamber.

20. A lawn mower comprising:
a vehicle body;
a mower deck supported by or on the vehicle body, the mower deck comprising:
at least one rotationally driven blade configured to cut grass and generate an air flow capable of transporting the cut grass;
a cutting chamber housing the at least one blade; and
an ejection outlet adapted to allow the cut grass to be ejected;
at least one grass collection container collecting the cut grass ejected from the ejection outlet;
a first passage connecting the ejection outlet and the at least one grass collection container;
a second passage connecting the at least one grass collection container and at least one air chamber arranged in a vicinity of the cutting chamber;
said air chamber being located peripherally outside said cutting chamber;
a vertical partition wall separating the at least one air chamber and the cutting chamber comprising at least one of:
a curved section; and
an upper end extending to an upper inside surface of the mower deck; and
said driven blade being located inside said partition wall,
wherein an air flow supplied to the at least one air chamber from the at least one grass collection container is supplied to the grass collection container from the cutting chamber,
wherein air from said supplied air flow is introduced into the at least one air chamber at a location peripheral to the cutting chamber and functions to stand up the grass during grass cutting, and
wherein the at least one rotationally driven blade comprises plural blades and the at least one air chamber is located inside a rear portion of the mower deck and the vertical partition wall separates the cutting chamber from the at least one air chamber.

* * * * *